May 22, 1962     M. DUTSCHMANN ETAL     3,035,391
AGRICULTURAL BALING PRESS

Filed July 13, 1959     3 Sheets-Sheet 1

Max Dutschmann
Gustav Schulze
INVENTORS.

BY Karl F. Ross
AGENT.

May 22, 1962 M. DUTSCHMANN ETAL 3,035,391
AGRICULTURAL BALING PRESS
Filed July 13, 1959 3 Sheets-Sheet 2

Max Dutschmann
Gustav Schulze
*INVENTORS.*

BY *Karl F. Ross*

AGENT.

May 22, 1962    M. DUTSCHMANN ETAL    3,035,391
AGRICULTURAL BALING PRESS

Filed July 13, 1959    3 Sheets-Sheet 3

Max Dutschmann
Gustav Schulze
INVENTORS.

BY

Karl F. Ross
AGENT.

United States Patent Office 3,035,391
Patented May 22, 1962

3,035,391
AGRICULTURAL BALING PRESS
Max Dutschmann, Kirschau, and Gustav Schulze, Koblitz, Germany, assignors to VEB Fortschritt Erntebergungsmaschinen, Neustadt-Saxony, Germany, a corporation of Germany
Filed July 13, 1959, Ser. No. 826,513
Claims priority, application Germany Sept. 18, 1958
5 Claims. (Cl. 56—341)

Our present invention relates to agricultural machinery for the harvesting and/or processing of forage, hay, straw, or other crop materials. More particularly, our invention relates to improved gathering and transferral means contained within baling presses of the type wherein a crop material is compacted in a press channel by the action of a plunger or piston.

Such machines have heretofore been equipped with a pick-up mechanism which removed the crop material (e.g. hay) from the ground and carried it onto either a conveyor belt or an auger designed to lift the hay from the level of the pick-up mechanism to a press channel, a chopper blade or the like. Moreover, agricultural machines of this type are generally constructed with their processing sections (e.g. press channels, chopper blades, crushers, blower blades) relatively high above ground for the purpose of simplifying bale collection, permitting the use of large-diameter flywheels to increase the power of the processing device, and facilitating the installation of relatively large processing sections and mechanisms. To raise the crop material to the elevation of the processing channel, large-diameter pick-up drums or long belts have previously been required. Machinery accommodating such drums and conveyor belts necessitate longer, heavier and more expensive construction.

It is, therefore, an object of our invention to provide simpler and more positive-acting transfer means for directing a crop material into the processing section of an agricultural machine. A further object of this invention is the provision of crop-transfer means which will permit savings in weight, length and costs of such machinery for a given rate of yield, thus operating at increased efficiency.

A feature of our invention is the provision of a crop-gathering plate perpendicular to the rear wall of the crop-transferral chamber of an agricultural baling press, with the gathering plate advantageously sloping rearwardly from the crop inlet to facilitate the operation of a conventional feeding rake positioned at that inlet; the rear wall, accordingly, ascends at a backward inclination from its junction with the gathering plate. In accordance with another feature, a gatherer in the form of a preferably bifurcate lifting arm describes a kidney-shaped sweep motion in gathering a crop material from the gathering plate, transferring it transversely to the incoming motion of the crop material and raising the crop material from the gathering plate to the level of another working section, such as a press channel wherein this material is compacted by a plunger or piston; the linkage between the gatherer and its power source is such that the pronged end of the lifting arm executes an accelerated forward stroke as it sweeps along the trough formed by rear wall and gathering plate to pick up the crop material accumulating in that trough.

These and additional objects, features and advantages of our present invention will be described in greater detail with reference to the accompanying drawing in which.

Figure 1:
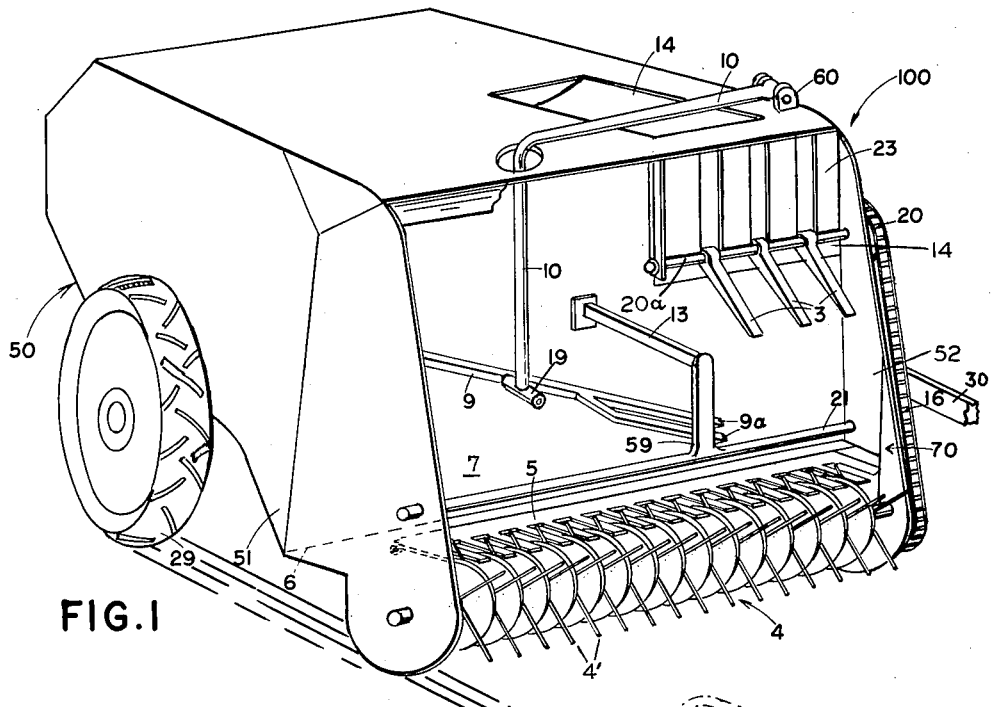
FIG. 1 is a perspective view of a baling press embodying the invention.

FIGS. 1–5 show an agricultural baling press 100 comprising a housing 50 mounted on an undercarriage including wheels 29 and an axle 64. The machine, which can be drawn by a tow bar 30 journaled on axle 64, also includes a pick-up drum 4 having resilient teeth 4' driven by a drive chain 16, a stripper plate 5 of comb-like configuration registering with teeth 4', a gathering plate 6 detachably supporting stripper plate 5 as a downwardly sloping rear extension thereof, a backwardly inclined rear wall 7 substantially perpendicular to plate 6, a press channel 14 traversing that wall, and a rod 21 rigidly secured to side walls 51, 52 which together with rear wall 7 define an inlet chamber 70. A trough 71 is formed at the junction of wall 7 with plate 6. A gatherer 9, comprising a lifting arm terminating in a bifurcation 9a, is pivoted at 19 to an angularly bent guide bar 10 and at 17 to a crank 8 (best seen in FIGS. 2, 3, 5) which is rigidly secured to a crank shaft 55 journalled in wall 7. Crank shaft 55 is fastened to a driven sprocket 34 which is operatively connected via a chain 40 to a drive sprocket 56 (FIG. 5) whose shaft 28 co-operates with a shaft 27 through the interengagement of a pair of gears 27a, 27b respectively mounted thereon. A gear 57 keyed to shaft 27 is driven by a gear 2 secured to a main drive shaft 58 to which power is applied via a chain 63 from axle 64.

A strike bar 13 extends forwardly from wall 7 above the path of gatherer 9 and is connected with rod 21 by a lug 59. This bar is designed to eliminate the fall-back of crop material on the return motion of gatherer 9. Rotating rake arms 3 (FIG. 1) whose shaft 20a is attached to a sprocket 20 operatively linked with chain 16 and a chain 43 (shown in FIG. 5) driven by a sprocket 42 on shaft 58, are functionally positioned to transfer crop material from gatherer 9 into the mouth of press channel 14. Guide bar 10 has its upper, horizontal leg 10a journaled in a bracket 60 secured to housing 50. A plunger 1 (FIGS. 2, 4, 5), rigid with a swingable arm 61 pivoted at 22 (FIG. 4), describes an arcuate path with the relatively long arm 61 as its radius. A drive rod 62 (FIG. 5), articulated at one extremity to a wheel 41 on drive shaft 58 and at the other extremity to plunger 1 through an arcuate slot 14' in press-channel wall 14'' which forms a partition in the compartment behind wall 7, converts the rotary motion of the drive shaft into the requisite oscillatory motion of plunger 1. A tying mechanism is schematically represented by a needle 24 co-operating with a knotter 65 powered from the drive shaft 58 by a chain 26 and a sprocket 25; such tying mechanisms are known per se and will not be further described here. A grid of vertically extending stripper bars 23 is functionally positioned to accomplish the total deposition of the crop material in the press channel 14. It should be noted that the rake arms 3 may be constructed of a somewhat resilient material if so desired.

Figure 6:
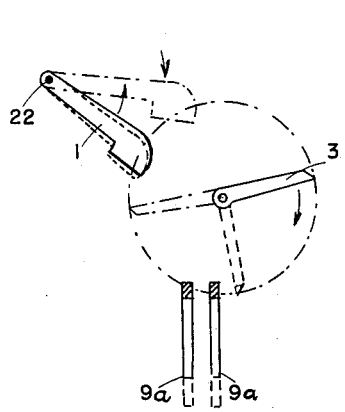
FIG. 6 is a motion diagram of certain co-operating elements.
Figure 7:
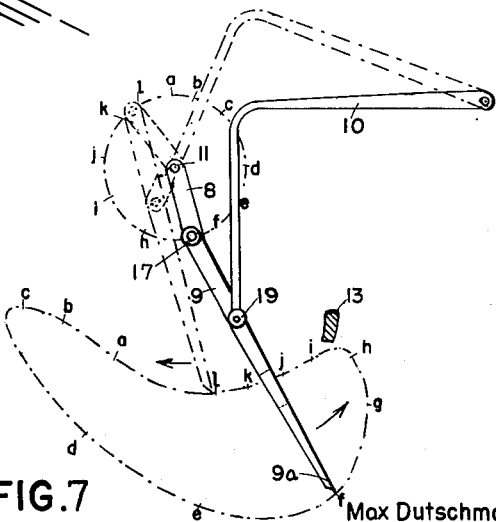
FIG. 7 is a motion diagram of other co-operating elements of the machine according to our invention.
Figure 2:
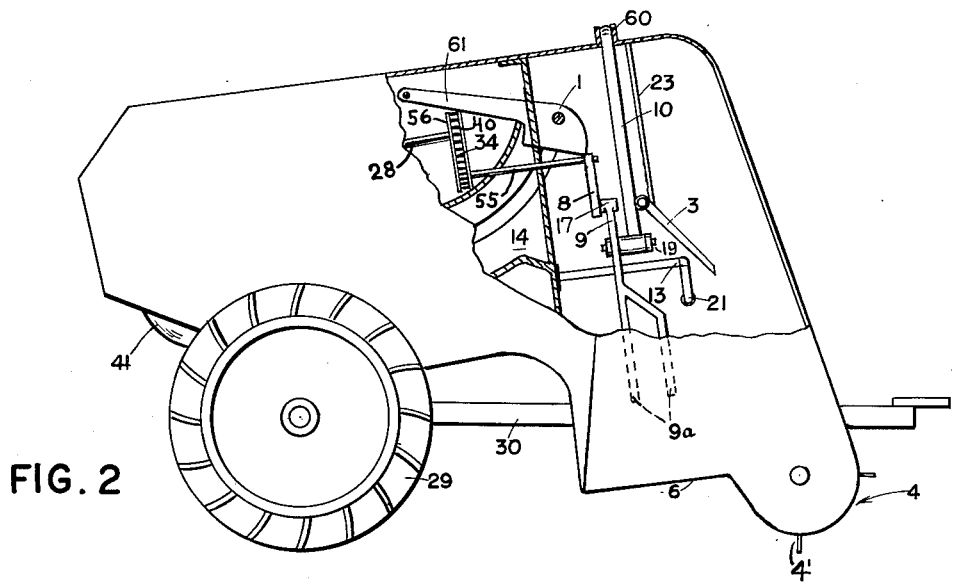
FIG. 2 is a side-elevational view, partly in section, of the machine shown in FIG. 1.
Figure 3:
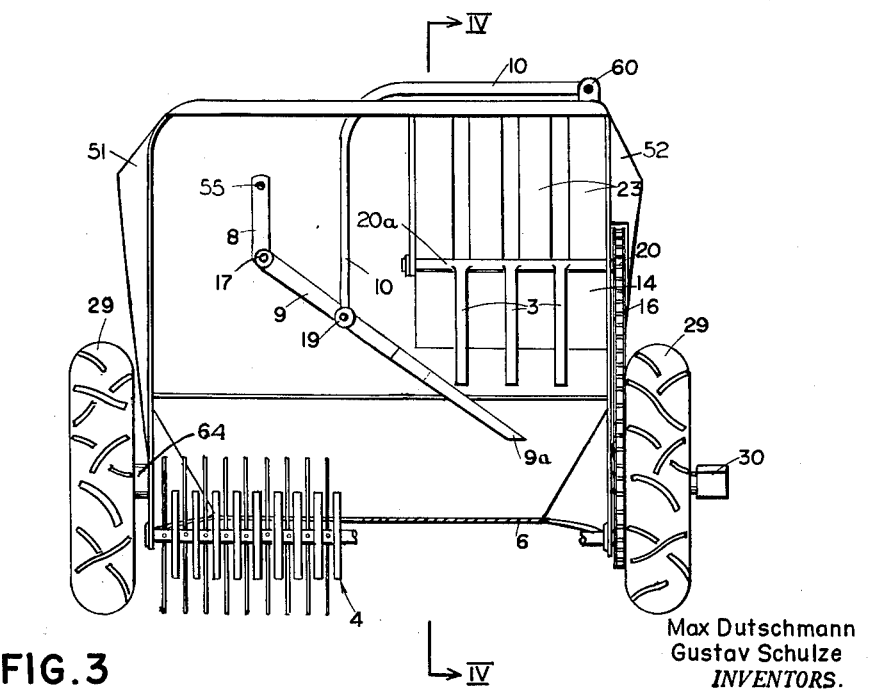
FIG. 3 is a front-elevational view of the machine.
Figure 4:
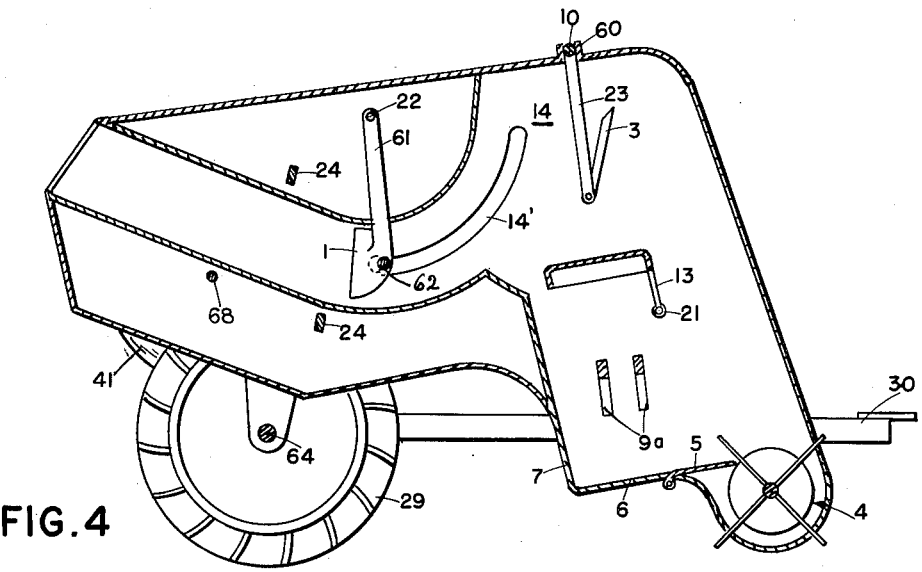
FIG. 4 is a cross-sectional view taken on line IV—IV of FIG. 3.
Figure 5:
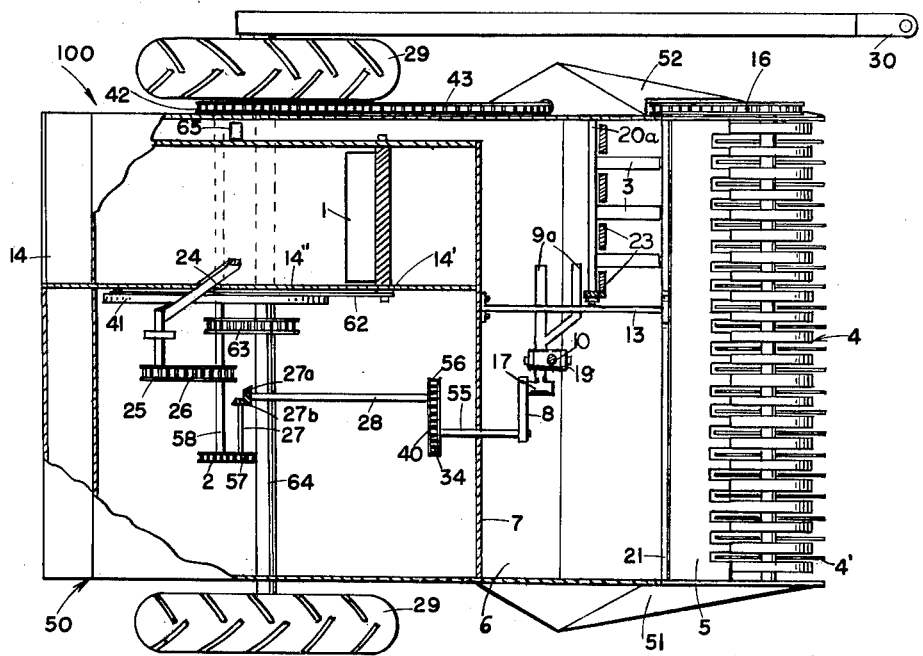
FIG. 5 is a top-plan view of the same machine.

In FIGS. 6 and 7 we show the co-ordinating positions of the several co-operating elements including gatherer 9, feeding rake 3 and plunger 1.

In operation, as will be apparent with particular reference to FIGS. 3, 4, 6 and 7, the hay, straw, or other crop material to be bundled is delivered to the gathering plate 6 by chain-driven pick-up member 4 as is well known per se. After accumulating in the trough 71 formed by the inclined plate 6 at its junction with wall 7, the material is swept along that trough and elevated along a kidney-shaped path (FIGS. 3, 7) into the path of the rotary rake 3. Rake arms 3 execute a rotary motion (FIG. 6) generally perpendicular to the plane of the kidney-shaped orbit of gatherer 9, thereby delivering the stalks into the path of plunger 1 which compacts them against the bales previously formed in the press channel 14 and not yet ejected therefrom or against frictional forces resisting the displacement of crop material therein. Needle 24 cooperates with plunger 1 to tie the bales.

The kidney-shaped sweep of arm 9 results from the rotary motion of crank 8 (FIG. 3) about the horizontal shaft 55 and from the restraining action of guide-bar 10 as it swings in a vertical plane about its fulcrum 60. As will be apparent from FIG. 7, where successive positions of this arm have been designated by letters a—a, b—b etc. through h—h, the sweep of its pronged extremity 9a accelerates during its forward stroke (positions d—d to g—g) and is greatly retarded on the return stroke (positions h—h to c—c), thereby enabling the accumulation of a sufficient amount of crop material in the aforedescribed trough between sweeps.

It will be apparent to persons skilled in the art that the agricultural baling press shown above will function with a tractor power take-off, an auxiliary engine or other means driving the main drive shaft 58. This invention can, of course, be used in other agricultural machines and further modifications may be made which will be readily understood by persons skilled in the art and are intended to be embraced by the spirit and scope of the invention as defined in the appended claims.

We claim:

1. In an agricultural baling press having a housing provided with a crop-gathering plate, a wall rising from said plate and forming a trough therewith, said wall having an opening above said plate, and a press channel extending generally transversely to said plate and communicating with said opening, said baling press further comprising piston means reciprocable in said press channel for compacting crop material fed thereto through said opening and pick-up means for depositing crop material upon said plate, the improvement which comprises a lifting arm positioned to sweep along said rear wall in a plane parallel thereto and provided with a lower end engageable with crop material disposed on said plate for elevating said material thereabove into the region of said opening, at least one transferring member disposed in the region of said opening and displaceable substantially in a plane transverse to said wall for shifting the material elevated by said lifting arm through said opening into the path of said piston means, and drive means for operating said arm and said member, said drive means including mechanism for imparting to said lower end of said arm a generally kidney-shaped motion sweeping close above said plate and thence rising substantially to the level of said opening.

2. A baling press according to claim 1 wherein said mechanism includes a crank pivotally linked with an upper extremity of said arm and a guide bar pivotally linked with an intermediate point of said arm, said guide bar being swingable about a substantially horizontal pivotal axis on said housing.

3. A baling press according to claim 2 wherein said guide bar is elbow-shaped and has a substantially horizontal leg extending above said housing and overlying said press channel.

4. A baling press according to claim 1 wherein said gathering plate slopes downwardly from said pick-up means toward said rear wall.

5. A baling press according to claim 4 wherein said rear wall rises at a rearward inclination and is substantially perpendicular to said gathering plate.

References Cited in the file of this patent

UNITED STATES PATENTS

| 2,633,691 | Lytle | Apr. 7, 1953 |
| 2,817,945 | McClellan | Dec. 31, 1957 |
| 2,909,887 | Claas | Oct. 27, 1959 |

FOREIGN PATENTS

| 496,143 | Canada | Sept. 15, 1953 |
| 1,106,586 | France | July 20, 1955 |
| 757,969 | Great Britain | Sept. 26, 1956 |